United States Patent [19]
Lee

[11] Patent Number: 5,536,221
[45] Date of Patent: Jul. 16, 1996

[54] RETROFIT MEANS FOR ADJUSTING SHIFT TIMING IN AN EXISTING AUTOMATIC TRANSMISSION

[75] Inventor: Edward Lee, Chesapeake City, Md.

[73] Assignee: Deltrans, Inc., Newark, Del.

[21] Appl. No.: 291,135

[22] Filed: Aug. 16, 1994

[51] Int. Cl.$^6$ .............................. F16H 61/04; F16H 61/08
[52] U.S. Cl. ......................... 477/143; 477/150; 74/606 R
[58] Field of Search ............................ 475/128; 74/606 R; 477/127, 135, 143, 144, 145, 150, 130; 192/87.18

[56] References Cited

U.S. PATENT DOCUMENTS

| | | | |
|---|---|---|---|
| 3,752,015 | 8/1973 | Murakami | 477/150 |
| 3,800,627 | 4/1974 | Oberpichler | 477/145 |
| 4,274,307 | 6/1981 | Iwanaga et al. | 477/150 |
| 4,346,627 | 8/1982 | Kawamoto et al. | 477/131 |
| 4,449,426 | 5/1984 | Younger | 74/606 R |
| 4,727,773 | 3/1988 | Sumiya et al. | 477/149 |
| 4,729,265 | 3/1988 | Sugano | 477/150 |
| 4,730,521 | 3/1988 | Hayasaki et al. | 477/117 |
| 4,753,134 | 6/1988 | Hayasaki | 477/144 X |
| 4,930,375 | 6/1990 | Yamamoto et al. | 477/152 |
| 5,038,637 | 8/1991 | Sugano | 477/143 X |
| 5,111,717 | 5/1992 | Takeuchi et al. | 477/148 |
| 5,111,719 | 5/1992 | Okahara | 477/150 X |
| 5,117,712 | 6/1992 | Goto et al. | 475/128 |
| 5,184,528 | 2/1993 | Mochizuki | 475/128 |
| 5,275,069 | 1/1994 | Baba et al. | 475/117 |
| 5,417,627 | 5/1995 | Iizuka | 477/143 |

FOREIGN PATENT DOCUMENTS

| | | | |
|---|---|---|---|
| 405231526 | 9/1993 | Japan | 477/143 |

OTHER PUBLICATIONS

"Principles of Operation of THM 700-R4 Hydra-matic Transmissions," Chevrolet Division of General Motors Corp., First Edition 1981, pp. 58, 60-63, 78-79, 84-85.

Primary Examiner—Khoi Q. Ta
Attorney, Agent, or Firm—Connolly and Hutz

[57] ABSTRACT

A valve is provided in one of the accumulator oil passageways provided between the servo and the 2-3 shift valve of an automatic transmission to partially restrict or control the flow of oil to and from the servo and clutch, thus adjusting the timing of shifts from second to third gear. The added valve or metering device would allow for a size increase of an orifice from the manual valve while maintaining proper timing of the apply/release of the 3-4 clutch and 2-4 band. The invention allows larger oil volume for both apply/release of the 3-4 clutch and 2-4 band, decreasing clutch failures and increasing transmission life expectancy. The invention is particularly advantageous with THM 700-R4 and 4L60-E automatic transmissions for 4-, 6- or 8-cylinder vehicles.

12 Claims, 4 Drawing Sheets

RETROFIT MEANS FOR ADJUSTING SHIFT TIMING IN AN EXISTING AUTOMATIC TRANSMISSION

BACKGROUND OF THE INVENTION

The present invention relates to an improved automatic transmission and a method for adjusting shift timing in an automatic transmission. The invention is particularly advantageous for improving the shift timing during a shift from second to third gear.

The clutch of an automatic transmission in a 4, 6 or 8-cylinder vehicle may be damaged by improper timing during any shifts. Timing of such shifts is controlled by the flow of transmission oil between the servo, shift valves and clutch. During a shift from second to third gear, for example, the 3-4 clutch must apply as the 2-4 band releases. If transmission oil does not flow to the clutch and the release side of the 2-4 servo at properly controlled ratios, damage will occur.

A schematic diagram of prior art THM 700-R4 or 4L60-E transmissions 70 is provided in FIG. 3. In these prior art transmissions, as the transmission shifts from second to third gear, transmission oil flows through an orifice 28 plus unseated check ball 30, between the 3-2 control valve and the 2-4 servo toward the release side of the 2-4 servo. Both the 3-4 apply oil and 2-4 band release oil must pass through a single orifice 14 from the manual valve 12. Therefore, the apply of the 3-4 clutch and release of the 2-4 band do not occur smoothly and in proper timing at varying vehicle speeds. The failure rate for 3-4 clutches in these THM transmissions is known to be excessive and has been estimated to be as high as 35%.

SUMMARY OF THE INVENTION

My invention is an improvement to motor vehicle automatic transmissions that have a clutch connected by an oil passageway to a shift valve, with the shift valve connected by a second oil passageway to a servo with a release side. The transmission has a clutch accumulator check ball valve and a clutch accumulator orifice disposed in parallel in the second oil passageway between the shift valve and the release side of the servo. At least one flow control means is positioned in the second oil passageway between the shift valve and the release side of the servo. Said flow control means partially restricts the flow of hydraulic fluid (accumulator oil) when said fluid flows to the release side of the servo and to the clutch for engaging the clutch, but does not restrict the flow of hydraulic fluid when such fluid flows away from the release side of the servo. The flow control means properly meters the flow of hydraulic fluid to the release side of the servo while the vehicle is shifting or changing from second to third gear. The flow control means may be positioned in the second oil passageway between the shift valve and the release side of the servo either before or after the clutch accumulator check ball valve and clutch accumulator orifice, but the position after the clutch accumulator check ball valve and clutch accumulator orifice is preferred. Preferably, the flow control means is a valve, such as a check ball valve. If a check ball valve is used, an orifice will also be provided in parallel in the oil passageway to allow some flow of hydraulic fluid through the orifice when the check ball valve is seated to restrict flow.

In a transmission according to the invention, the valve, or valve in combination with an orifice, meters or partially restricts the flow of accumulator oil to the release side of the servo while the vehicle is changing gear. The valve (and orifice) control the build-up of accumulator oil pressure at the servo. In a detent or modulated downshift to a lower gear, such as from third to second gear, the valve (and orifice) open to allow the accumulator oil to flow out of the release side of the servo to exhaust. Because the accumulator oil has been metered to the servo, oil volume is lower than it otherwise would have been without the valve (and orifice) of the invention. As a result, the clutch is applied more smoothly and the lower gear band is released in the proper timing sequence to prevent damage to the clutch. Reversing the flow of this oil for a downshift is accomplished more quickly and with less fluid inertia.

DESCRIPTION OF THE PREFERRED EMBODIMENT

Figure 1:
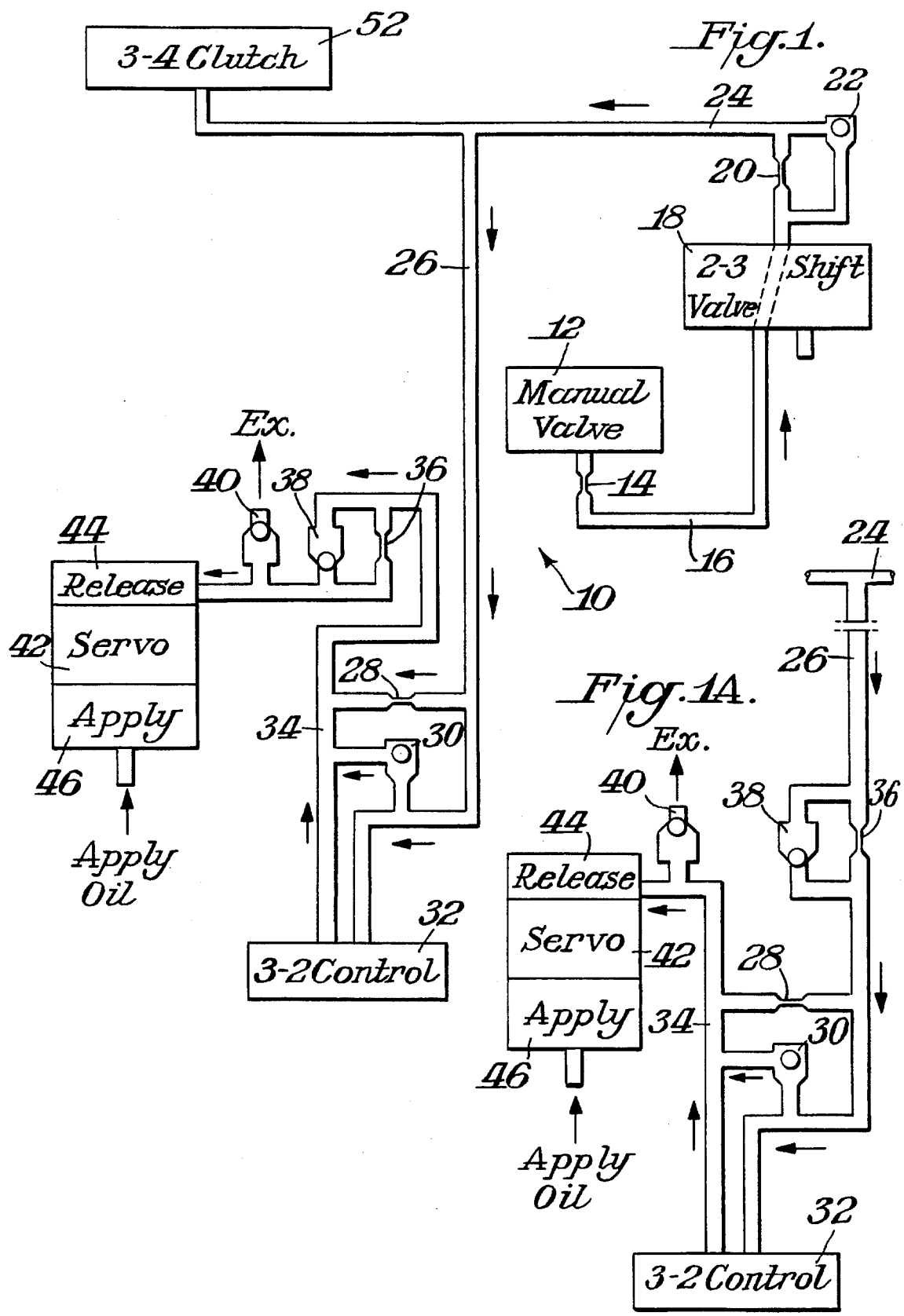
FIG. 1 is a schematic diagram of an automatic transmission according to the invention operating in third gear.

Referring to FIG. 1, there is shown in schematic an automatic transmission 10 according to the invention in which the vehicle is operating in third gear. The vehicle may have four, six or eight cylinders. The arrows adjacent the passageways indicate the direction of the flow of transmission oil through each respective passageway.

As shown in FIG. 1, oil from the manual valve 12 flows through an orifice 14 and through the D3 oil passageway 16 to the 2-3 shift valve 18. Governor oil opens the 2-3 shift valve 18 and RND4D3 oil or third clutch oil enters the third clutch oil passageway 24 through the 3-2 exhaust orifice 20 and the 3-2 exhaust check ball valve 22, which is unseated. The 3-4 clutch (clutch piston) is applied.

Third clutch oil from the 2-3 shift valve 18 is also directed through the third clutch accumulator oil passageway 26 and past the unseated third clutch accumulator check ball valve orifice 28 and 3-2 control valve 32. This oil then flows through the release oil passage 34 and the third clutch second orifice 36. The oil seats the third clutch second accumulator check ball valve 38 and third accumulator exhaust check ball valve 40 and is finally directed into the release side 44 of the 2-4 servo 42. The third clutch accumulator pressure, combined with the servo cushion spring (not shown), moves the second apply piston (not shown) in the 2-4 servo 42 against second clutch oil and acts as an accumulator for a smooth 2-4 band release and 3-4 clutch apply. Third clutch oil is present at the 3-2 control valve 32 in preparation for a third gear to second gear downshift.

While the vehicle is operating in third gear at speeds below about 60 mph (96 km/h), a detent or modulated 3-2 downshift may be caused if the driver depresses the accelerator pedal fully. The rate at which the 3-4 clutch 52 releases and the 2-4 band (not shown) applies during the detent 3-4 downshift is controlled primarily by the 3-2 control valve 32.

Figure 2:
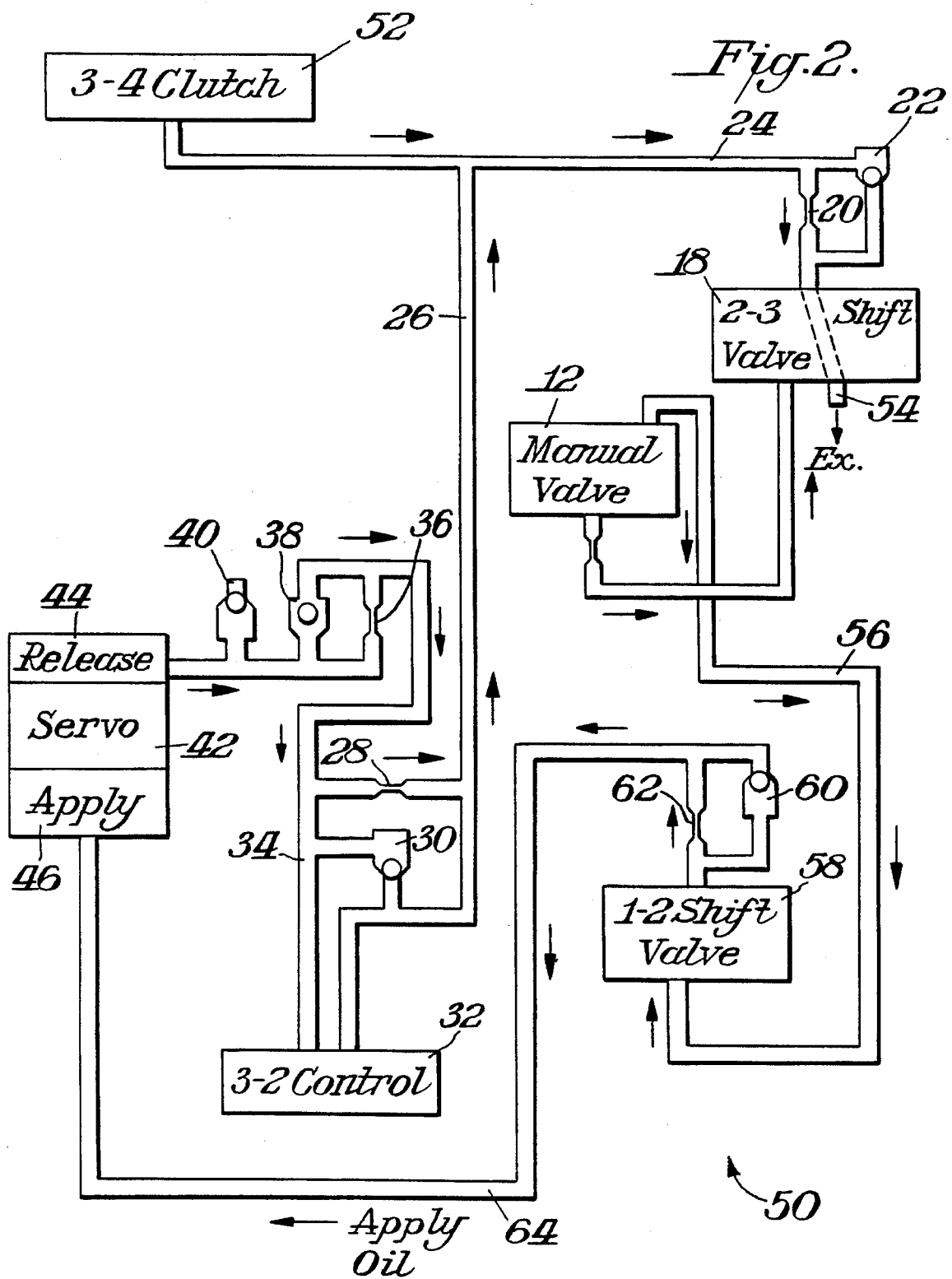
FIG. 2 is a schematic diagram of an automatic transmission according to the invention operating at a detent or modulated downshift from third gear to second gear.

At vehicle speeds above about 50 mph (80 km/h) governor oil acts on the 3-2 control valve and closes it. During detent or modulated downshifts, the exhausting third clutch apply oil and third clutch accumulator oil is regulated by the 3-2 control valve 32 according to vehicle speed. FIG. 2 shows a schematic of the automatic transmission 50 during a detent downshift from third to second gear. Referring to FIG. 2, detent oil closes the 2-3 shift valve 18. Exhausting third clutch apply oil flows from the 3-4 clutch 52 through the third clutch oil passageway 24, seats the 3-2 exhaust check ball valve 22 and passes through the 3-2 exhaust orifice 20 to exhaust 54 from the 2-3 shift valve 18.

At about the same time, exhausting third clutch accumulator oil from the release side 44 of the 2-4 servo 42 flows through the release oil passageway 34, seating the third accumulator exhaust check ball valve 40 to prevent exhaust of the accumulator oil. The exhausting third clutch accumulator oil then flows through the unseated third clutch second accumulator check ball valve 38 and orifice 36 provided according to the invention. The oil next flows through the third clutch first orifice 28. The third clutch accumulator check ball valve 30, however, is seated to preclude oil flow. Depending upon vehicle speed, the 3-2 control valve 32 may also be closed to flow of the exhausting third clutch accumulator oil. During a detent or modulated downshift from third to second gear, the exhausting third clutch accumulator oil must exhaust only through the third clutch first orifice 28 into the third clutch accumulator oil passageway 26 to be exhausted from the 2-3 shift valve 18 along with the exhausting third clutch apply oil. The 3-4 clutch piston (not shown) releases gradually.

While the third clutch apply oil and third clutch accumulator oil exhausts, apply oil flows from the manual valve 12 through a passageway 56 to the 1-2 shift valve 58. The 1-2 shift valve 58 regulates flow of the apply oil to the apply side 46 of the 2-4 servo 42. Apply oil from the 1-2 shift valve 58 seats the 1-2 exhaust check ball valve 60 and flows only through 1-2 exhaust orifice 62 into the apply oil passageway 64 to the apply side 46 of the 2-4 servo 42. With the 3-4 clutch released, the apply oil at the 2-4 servo will apply the 2-4 band and the transmission shifts into second gear.

Figure 3:
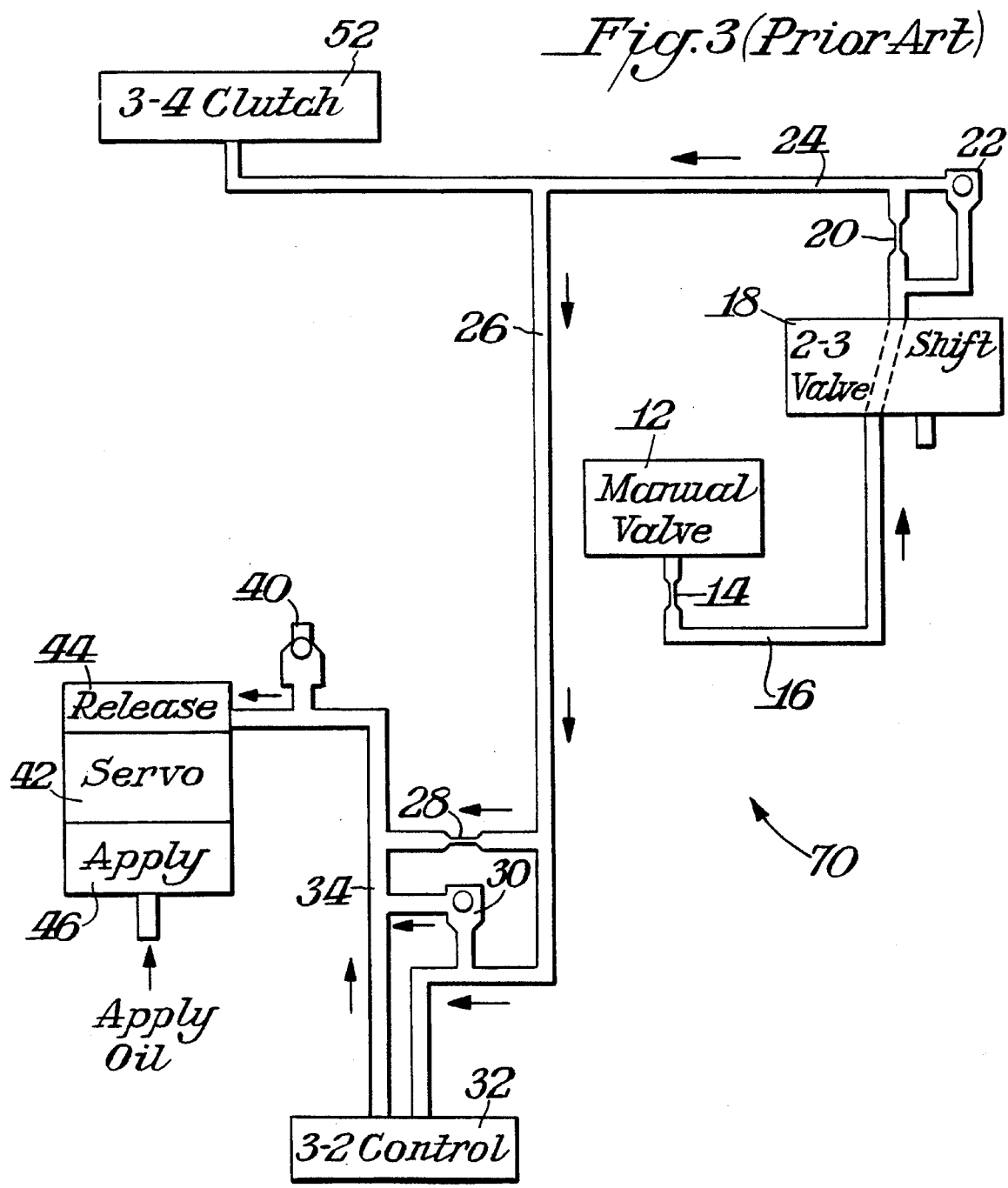
FIG. 3 (Prior Art) is a schematic diagram of a prior art automatic transmission operating in third gear.

Referring now to FIG. 3, the prior art transmissions 70, such as the THM 700-R4 and 4L60-E transmissions, are provided with only orifice 14, to restrict flow from the manual valve 12. On a shift from second to third gear, orifices 20 and 28 do not restrict flow and are ineffective because corresponding check balls 22 and 30 are not seated and thus open. Because the 3-4 clutch apply and 2-4 servo release require varying volume/rates of oil at different vehicle speeds, it is virtually impossible for both to operate properly at varying speeds while being supplied through a single orifice 14. As a result, the size of the orifice 14 must be such that the oil flow therethrough is kept at a rate to best compromise the apply/release of the 3-4 clutch and 2-4 band. Consequently, damage due to improper shift timing occurs.

It is my invention to provide a valve, preferably a check ball valve 38, to partially restrict the flow of third clutch accumulator oil to the release side 44 of the 2-4 servo 42. Most preferably, an orifice 36 is provided in combination with the valve. The valve 38, or valve 38 in combination with an orifice 36, may be positioned in a passageway between the 2-3 shift valve and the release side 44 of the 2-4 servo 42, such as release oil passageway 34, or the third clutch accumulator passageway 26. In addition, the valve and servo spacer plate (FIGS. 4 and 5) in the transmission could be factory-modified to provide a valve, or a valve in combination with an orifice for the third clutch accumulator oil.

Figure 4:
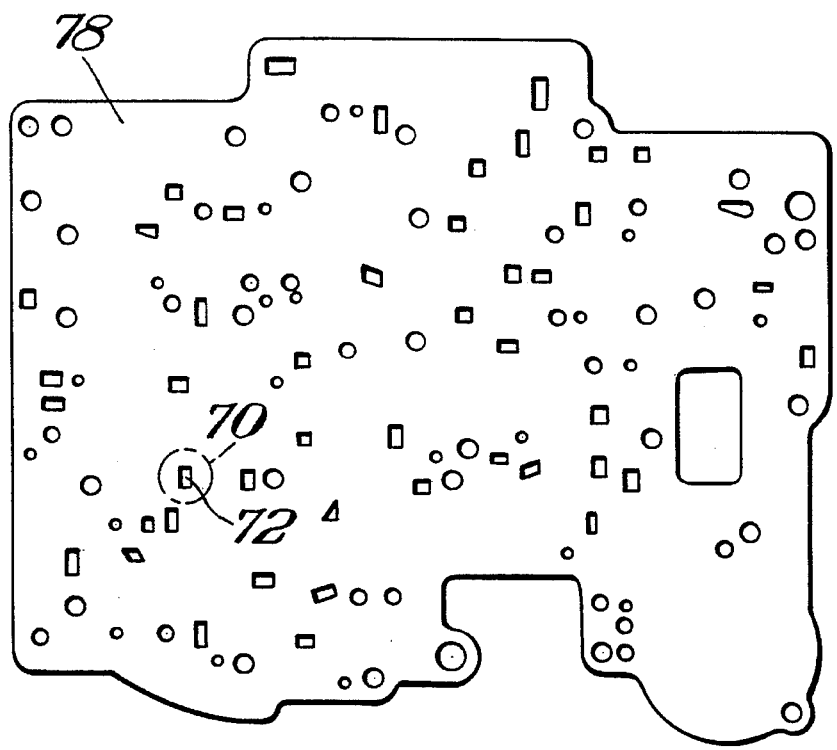
FIG. 4 (Prior Art) is a top plan view of a transmission spacer plate of the prior art.

As shown in FIG. 4, a transmission valve and servo spacer plate 78 used in THM 700-R4 or 4L60-E transmissions has rectangular openings for passageways for hydraulic fluid flow and circular openings for seating fluid control means, such as check ball valves, or for orifices for fluid flow, or for bolts to hold the plate in place. Region 80 (in phantom outline) on the spacer plate 78 indicates the region of the plate where the hydraulic fluid passes through the opening 82 in the plate as the fluid flows between the 2-3 shift valve and the release side of the servo.

Figure 5:
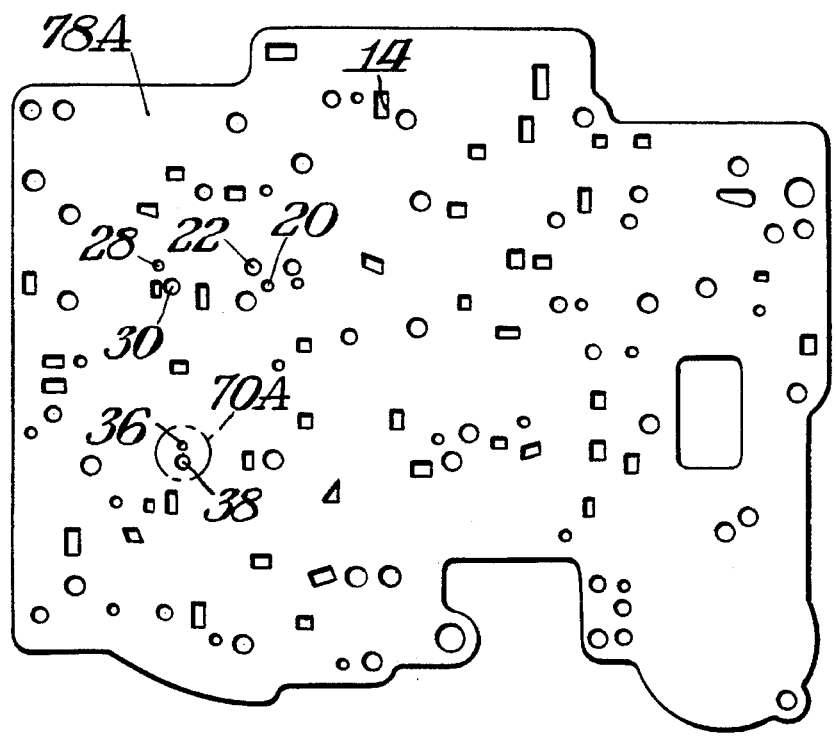
FIG. 5 is a top plan view of a transmission spacer plate according to the invention.

FIG. 5 shows a transmission valve and servo plate 78A modified according to the invention. The passageway openings through the plate for orifice 14, 3-2 exhaust orifice 20, 3-2 exhaust check ball valve 22, orifice 28 and clutch accumulator check ball valve 30 are shown on the plate 78A. Region 80A (phantom outline) corresponds to region 80 in FIG. 4. According to the present invention, region 80A has been modified to replace opening 82 with an opening for the third clutch second orifice 36 and an opening for the third clutch second accumulator check ball valve 38. Alternate fluid flow control means could be employed, but the plate 78A shows openings for a check ball valve 38 and orifice 36.

For four- and six-cylinder engines, the orifice diameter should preferably be between about 0.051 to 0.055 inches. For eight-cylinder engines, since the servo apply area is larger, the orifice diameter may be as large as 0.059 inches.

In a transmission according to the invention, the valve, such as the third accumulator second check ball valve 38, preferably in combination with the third accumulator second orifice 36, meter or partially restrict the flow of accumulator oil to the release side 44 of the 2-4 servo 42 while the vehicle is shifting from second to third gear. The valve 38 and orifice 36 control the build up of accumulator oil pressure at the 2-4 servo 42. In a detent or modulated downshift to second gear, both the check ball valve 38 and orifice 36 are open to allow the accumulator oil to flow out the first orifice 28 and exhaust through the 2-3 shift valve 18. With the invention, smooth release of the 3-4 clutch 52 and application of the second gear band is accomplished during a detent or modulated downshift because the amount of accumulator oil that flows from the release side 44 of the 2-4 servo 42 will pass through the third clutch first orifice 28 within the proper amount of time.

This invention is not limited to the specific embodiment illustrated and described above. Changes may be made without departing from the spirit of the invention.

I claim:

1. In an automatic transmission of a motor vehicle that has a shift valve connected by an oil passageway to a clutch which is further connected by a second oil passageway to a servo with a release side, wherein the transmission has a clutch accumulator check ball valve and clutch accumulator orifice disposed in parallel in the second oil passageway, the improvement comprising:

a flow control means positioned in the second oil passageway between the shift valve and the release side of the servo for restricting the flow of hydraulic fluid to the release side of the servo when said fluid flows from the shift valve to the clutch for engaging said clutch, and for allowing unrestricted flow of the hydraulic fluid from the release side of the servo.

2. The automatic transmission of claim 1, wherein the flow control means positioned in the second oil passageway is a check ball valve with a check ball and an opening, and an accompanying orifice is positioned within the second oil passageway in parallel with the check ball valve so that some hydraulic fluid flows through the orifice when the check ball is seated in the opening of the check ball valve.

3. The automatic transmission of claim 1, wherein the flow control means is provided in the second oil passageway between the shift valve and the release side of the servo and said fluid control means is positioned downstream from the clutch accumulator check ball valve and clutch accumulator orifice in the second oil passageway.

4. The automatic transmission of claim 1, wherein the flow control means is provided in the second oil passageway between the shift valve and the release side of the servo and said fluid control means is positioned upstream from the clutch accumulator check ball valve and clutch accumulator orifice in the second oil passageway.

5. The automatic transmission of claim 1, wherein the flow control means is provided in a transmission spacer plate between the shift valve and the release side of the servo and said flow control means positioned downstream from the clutch accumulator check ball valve and clutch accumulator orifice in the second oil passage way.

6. The automatic transmission of claim 1, wherein the flow control means is provided in a transmission spacer plate between the shift valve and the release side of the servo and said fluid control means is positioned upstream from the clutch accumulator check ball valve and clutch accumulator orifice in the second oil passageway.

7. A method for adjusting shift timing in an automatic transmission in a motor vehicle wherein the transmission has a shift valve connected by an oil passageway to a clutch which is further connected by a second oil passageway to a servo with a release side, and wherein the transmission has a clutch accumulator check ball valve and clutch accumulator orifice disposed in parallel in the second oil passageway, the improvement comprising:

restricting the flow of hydraulic fluid to the release side of the servo by positioning a fluid control means in the second oil passageway between the shift valve and the release side of the servo and allowing unrestricted flow of the hydraulic fluid by said fluid control means when said fluid flows away from the release side of the servo.

8. The method of claim 7, wherein the fluid control means is a check ball valve with a check ball and an accompanying orifice disposed in parallel with the check ball valve with said check ball valve and orifice positioned within the second oil passageway so that some hydraulic fluid flows through the orifice when the check ball is seated in the check ball valve.

9. The method of claim 7, wherein the fluid control means is provided in the second oil passageway between the shift valve and the release side of the servo and said fluid control means is positioned downstream from the clutch accumulator check ball valve and clutch accumulator orifice in the second oil passageway.

10. The method of claim 7, wherein the fluid control means is provided in the second oil passageway between the shift valve and the release side of the servo and said fluid control means is positioned upstream from the clutch accumulator check ball valve and clutch accumulator orifice in the second oil passageway.

11. The method of claim 7, wherein the fluid control means is provided in a transmission spacer plate between the shift valve and the release side of the servo and said fluid control means is positioned downstream from the clutch accumulator check ball valve and clutch accumulator orifice in the second oil passage way and in a transmission spacer plate.

12. The method of claim 7, wherein the fluid control means is provided in a transmission spacer plate between the shift valve and the release side of the servo and said fluid control means is positioned upstream from the clutch accumulator check ball valve and clutch accumulator orifice in the second oil passageway.

\* \* \* \* \*